US008926884B2

(12) United States Patent
Kratz et al.

(10) Patent No.: US 8,926,884 B2
(45) Date of Patent: Jan. 6, 2015

(54) METHOD FOR PROGRAMMING A SHAPE MEMORY POLYMER WHILE DEFINING THE SWITCH TEMPERATURE BY SELECTION OF THE PROGRAMMING TEMPERATURE

(75) Inventors: Karl Kratz, Berlin (DE); Andreas Lendlein, Berlin (DE); Ulrike Voigt, Hamburg (DE); Wolfgang Wagermaier, Potsdam (DE)

(73) Assignee: Helmholtz-Zentrum Geesthacht Zentrum für Material-und Küstenforschung GmbH, Geesthacht (DE)

( * ) Notice: Subject to any disclaimer, the term of this patent is extended or adjusted under 35 U.S.C. 154(b) by 410 days.

(21) Appl. No.: 13/092,761

(22) Filed: Apr. 22, 2011

(65) Prior Publication Data
US 2012/0018922 A1 Jan. 26, 2012

Related U.S. Application Data

(63) Continuation of application No. 12/865,344, filed as application No. PCT/EP2009/050992 on Jan. 29, 2009, now abandoned.

(30) Foreign Application Priority Data

Jan. 30, 2008 (DE) .......................... 10 2008 007 362

(51) Int. Cl.
*B29C 61/06* (2006.01)
*B29K 67/00* (2006.01)
(52) U.S. Cl.
CPC ............. *B29C 61/06* (2013.01); *B29K 2067/00* (2013.01)
USPC ........................................ 264/322; 264/297.1
(58) Field of Classification Search
CPC ............................. B29C 61/06; B29C 2061/06
USPC ................................................ 264/297.1, 322
See application file for complete search history.

(56) References Cited

U.S. PATENT DOCUMENTS

2007/0290167 A1* 12/2007 Mather et al. ............ 252/299.01

FOREIGN PATENT DOCUMENTS

WO    WO 2006/086011 A2    8/2006

OTHER PUBLICATIONS

P. Miaudet et al: "Shape and Temperature Memory of Nanocomposites with Broadened Glass Transition"; Science vol. 318, Nov. 23, 2007, pp. 1294-1296.

(Continued)

*Primary Examiner* — Larry Thrower
*Assistant Examiner* — Xue Liu
(74) *Attorney, Agent, or Firm* — VLP Law Group LLP; Kent H. Cheng

(57) ABSTRACT

The invention relates to a method for programming a shape memory polymer, which comprises at least one switching segment having at least one thermal phase transition and covalent and/or non-covalent cross-linking points such that the shape memory polymer after the programming thereof is in a position to transition from a programmed temporary shape into the permanent shape thereof, following a temperature increase to a temperature that at least corresponds to a switching temperature ($T_{switch}$, $T_{\sigma max}$). According to the invention, the method comprises (a) predetermining a programming temperature ($t_{prog}$) as a function of a desired switching temperature ($T_{switch}$, $T_{\sigma max}$), (b) heating the shape memory polymer to the predetermined programming temperature ($t_{prog}$), and transferring the polymer into a shape that corresponds to the temporary shape by applying a forced molding state, and (c) cooling the polymer to a temperature below the desired switching temperature ($T_{switch}$, $T_{\sigma max}$) while maintaining the forced molding state.

18 Claims, 7 Drawing Sheets

(56) References Cited

OTHER PUBLICATIONS

C.M. Yakacki et al., :"unconstrained recovery characterization of shape-memory polymer networks for cardiovascular applications"; Biomaterials; vol. 28, 2007, pp. 2255-2263.

R. Mohr, et al.: "Intiation of shape-memory effect by inductive heating of magnetic nanoparticles in thermosplastic polymers";PNAS; Mar. 7, 2006; vol. 103; No. 13; pp. 3540-3545.

Yanjun Zheng, et al.: "Temperature memory effect of a nickel-titanium shape memory alloy";Applied Physics Letters; vol. 84, No. 1; Jan. 5, 2004; pp. 31-33.

* cited by examiner

METHOD FOR PROGRAMMING A SHAPE MEMORY POLYMER WHILE DEFINING THE SWITCH TEMPERATURE BY SELECTION OF THE PROGRAMMING TEMPERATURE

This is a continuation of application Ser. No. 12/865,344, filed Jul. 29, 2010, a National Stage of International Application No. PCT/EP2009/050992, filed Jan. 29, 2009, claiming priority based on German Patent Application No. 10 2008 007 362.8 filed Jan. 30, 2008, the contents of all of which are incorporated herein by reference in their entirety.

The invention relates to a method for programming a shape memory polymer which has at least one switching segment having at least one thermal phase transition and covalent and/or non-covalent crosslinking points, so that, after its programming, the shape memory polymer is capable of undergoing a transition from a programmed temporary shape to its permanent shape after a temperature increase to a temperature which at least corresponds to a switching temperature.

Shape memory polymers (SMPs) have the ability of assuming at least one defined, temporarily fixed shape (A) after appropriate thermomechanical treatment and of returning to their original (permanent) form (B) after heating to a material temperature above the switching temperature. The shape memory polymers which show a thermally induced shape memory effect may be either covalent polymer networks (e.g. thermosets, photosets), thermoplastic elastomers (e.g. multiblock copolymers, polyester urethanes) or blends (polymer mixtures) and composites of the abovementioned plastics classes.

Shape memory polymers are composed at the molecular level of at least one type of switching segments for fixing the temporary, programmed shape (A) and network points for stabilizing the original permanent shape (B). The network points may be either of a physical nature or of a chemical nature (covalent crosslinkings). In the case of thermoplastic shape memory polymers, the switching segments are linked to one another via so-called rigid segments, physical melting and a complete loss of shape of the plastic resulting on exceeding the transition temperature of the rigid segments. If the polymer has two or more types of switching segments with different switching temperatures, it is theoretically also possible to program two or more temporary shapes which can be called up sequentially by successive heating, it having been possible to date, however, to realize only two shape transitions, i.e. two temporary shapes.

Establishing the switching temperature ($T_{switch}$ or $T_{\sigma,max}$) in the case of shape memory polymers with a thermal shape memory effect and composites thereof has to date required a chemical modification of the polymer, in particular of the switching segment, and an associated change in the transition temperature ($T_{trans}$) (e.g. Lendlein & Kelch, Angew. Chem. Int. Ed. Engl. 2002, 41, 2034-2057; Behl & Lendlein, Soft Matter 2007, 1, 58-67).

Establishing the transition temperature in the case of amorphous switching segments with a glass transition temperature ($T_{trans}=T_g$) is effected, for example, by varying the comonomer ratio in the copolymer switching segment (Lin & Chen, J. Appl. Polym. Sci. 1998, 69, 1575-1586) or by varying the molecular weight of the switching segment (Lin & Chen, J. Appl. Polym. Sci. 1998, 69, 1563-1574; Takahashi et al., J. Appl. Polym. Sci. 1996, 60, 1061-1069; Choi & Lendlein, Soft Matter 2007, 3, 901-909). In the case of semicrystalline switching segments with a melting point ($T_{trans}=T_m$), on the other hand, the transition temperature can be established, for example for poly-ε-caprolactone, by varying the molecular weight of the switching segment (e.g. Lendlein et al., J. Polym. Sci., Part A: Polym. Chem. 2005, 43, 7, 1369-1381; Kim et al., Polymer 1996, 37, 5781-5793).

A disadvantage of the solutions to date is that a fixed switching temperature is coordinated with each switching segment and said switching temperature can be varied only by chemical modification of the switching segment or of the ratio of switching segment to rigid segment, i.e. a new polymer must be synthesized. A method which permits the establishment of different switching temperatures in the case of one type of shape memory polymer or composite would therefore be desirable.

A so-called temperature memory could be detected only in the case of a shape memory composite material which consists of the polymer PVA (which itself has no shape memory properties) and carbon fibers (carbon nanotubes, CNT) incorporated therein (Miaudet et al.: Science 318 (2007), 1294-1296). This means that the switching temperature at which the transition from the programmed temporary shape to the permanent shape takes place shows a dependence on the programming temperature at which the deformation takes place. In particular, an increase in the switching temperature with increasing program temperatures was observed. For pure shape memory polymers, however, such a connection was ruled out. Rather, a direct correlation of the recovery temperature with the thermodynamic transition temperature $T_{trans}$ was always found here. A disadvantage of these composite materials which owe their shape memory not to the polymer but to the particles or fibers is, however, the lack of sharpness of the recovery temperature, i.e. the width of the recovery range $\Delta T_{rec}$ over which the shape transition takes place. This leads to an onset of the recovery at temperatures substantially below the switching temperature, which is undesired for many applications. In addition, corresponding "temperature memory" behavior has also been described for metallic shape memory alloys (SMA), which behavior can be established by carrying out an incomplete programming cycle (Zheng et al.: Appl. Phys. Lett. 2004, 84, 31-33).

It is therefore the object of the present invention to provide a method for programming a shape memory polymer which permits the establishment of different, predetermined switching temperatures without change in the chemical or physical composition of the shape memory polymer.

This object is achieved by a method for programming a shape memory polymer or its composite, the polymer having at least one switching segment with at least one thermal phase transition and covalent and/or non-covalent crosslinking points, so that, after its programming, it is capable of undergoing a transition from a programmed temporary shape to its permanent shape after a temperature increase to a temperature which corresponds at least to its switching temperature ($T_{switch}$, $T_{\sigma max}$). The programming method according to the invention has the steps:

(a) predetermination of a programming temperature ($T_{prog}$) as a function of a desired switching temperature ($T_{switch}$, $T_{\sigma max}$), (b) heating of the shape memory polymer to the predetermined programming temperature ($T_{prog}$) and transformation of the polymer into a shape corresponding to the temporary shape by use of forced shaping and (c) cooling the polymer to a temperature below the desired switching temperature ($T_{switch}$, $T_{\sigma max}$) while maintaining the forced shaping.

With the aid of the method according to the invention for programming a "temperature memory", it is possible to establish the switching temperature of any desired shape memory polymer (or of a composite containing a shape memory polymer and having shape memory properties) within certain limits without chemical variation of the switching segment. The basis of the invention is a thermomechanical treatment in which the programming temperature ($T_{prog}$), i.e. the temperature used during the programming deformation, is varied according to a desired switching temperature ($T_{switch}$, $T_{\sigma max}$). In this way, it is possible to establish the switching temperature of shape memory polymers by establishing the switching point of the switching segment by means of targeted selection of the programming temperature.

In the context of the present invention, switching temperature is understood as meaning the recovery temperature at which the shape transition from the temporary shape to the permanent shape takes place. If the recovery takes place in the absence of a load, the switching temperature $T_{switch}$ is obtained from the point of inflection of the strain-temperature curve. In the case of reheating under an applied load, i.e. in the case of constant shape, the switching temperature $T_{\sigma max}$ corresponds to the maximum of the stress-temperature curve (cf. working examples). The method according to the invention is not limited to pure shape memory polymers but can also be applied to composite materials which consist of a shape memory polymer or a blend of a plurality of shape memory polymers and particles distributed therein. The particles may be in particular magnetic materials which warm up in an alternating magnetic field or electrically conductive materials which permit Joule heating of the composite.

The substantial innovation of the method described for generating temperature memory behavior of shape memory polymers is the introduction of a novel parameter in the method for programming shape memory polymers, namely the programming temperature $T_{prog}$. This permits the systematic variation of the switching temperature in the range of at least 20 K, in particular of at least 30 K, typically in the range of 50 K. Compared with the shape memory composites described in Miault et al. (see above) comprising a polymer which itself has no shape memory and carbon nanotubes incorporated therein, the shape memory polymers programmed by the method according to the invention and composites thereof have a substantially smaller recovery range $\Delta T_{rec}$ and hence a transition which is substantially more strongly defined with respect to the temperature, which is important for many applications. Thus, a recovery range $\Delta T_{rec}$ of about 40 K could be obtained in the case of thermoplastic multiblock copolymers (cf. working example 1) and even of only about 15 K for multiphase polymer networks (cf. working example 6).

With the aid of the method described here for generating a temperature memory, it is possible in the case of shape memory polymers having semicrystalline or amorphous switching segments and composites thereof to establish different switching temperatures by variation of the temperature during the programming. Thus, for example, a temperature sensor (also see example 2) can be reprogrammed in its switching range or it is possible to realize different switching temperatures of a sensor with a shape memory polymer by selection of the programming temperature.

The invention presents a method from which a novel functionality, not described to date, of shape memory polymers, the temperature memory, results. The temperature memory describes the ability of a shape memory polymer to "perceive" the programming temperature. Thus, it is possible for the first time to establish the switching temperature of the switching segment of shape memory polymers by means of variation of the programming temperature without carrying out a chemical modification of the shape memory polymer.

According to an advantageous configuration of the method according to the invention, the predetermination of programming temperature ($T_{prog}$) is effected computationally with the use of an empirically determined mathematical relationship between the programming temperature ($T_{prog}$) and the switching temperature ($T_{switch}$, $T_{\sigma max}$). An experimental series in which the polymer is programmed at different programming temperatures (which of course must be in the region of or above the thermal phase transition temperature of the switching segment) and then the recovery is triggered by heating of the polymer and the switching temperature is determined is carried out for this purpose for a shape memory polymer of given chemistry. The mathematical relationship between the programming temperature and switching temperature can then be determined, for example, by means of a manual or automatic curve fitting method. The experiments carried out in the present invention (cf. examples) indicate that, as a rule, there is a substantially linear relationship between programming temperature and switching temperature, so that in most cases the determination of a simple linear function is sufficient to predetermine the programming temperature as a function of the desired switching temperature.

According to an alternative configuration of the method, the predetermination of the programming temperature ($T_{prog}$) is effected with the use of an empirically determined characteristic diagram containing parameter pairs comprising programming temperature ($T_{prog}$) and switching temperature ($T_{switch}$, $T_{\sigma max}$). As described above, an experimental series is carried out and the switching temperatures determined are assigned to the corresponding programming temperatures, and the required programming temperature is read from the characteristic diagram thus determined and stored in particular in computer-readable form, as a function of the desired switching temperature. Thus, undefined intermediate values can be determined in a known manner by mathematical interpolation.

It is particularly preferably intended to select the programming temperature $T_{prog}$ from a range of at least ±20 K around the thermodynamic phase transition temperature $T_{trans}$ of the at least one switching segment, in particular from a range of $T_{trans}$±25 K, preferably from a range of $T_{trans}$±30 K. In the case of a shape memory polymer which has two switching segments and hence two thermodynamic phase transition temperatures $T_{trans,A}$ and $T_{trans,B}$, the programming temperature $T_{prog}$ is selected from a range of at least $T_{trans,A}$±20 K to $T_{trans,B}$±20 K, in particular from a range of at least $T_{trans,A}$±25 K to $T_{trans,B}$±25 K, particularly preferably from a range of at least $T_{trans,A}$±30 K to $T_{trans,B}$±30 K.

The method according to the invention makes it possible to program an individual shape memory polymer several times in succession, different programming temperatures ($T_{prog}$) being used for the respective programming cycles and hence different switching temperatures ($T_{switch}$, $T_{\sigma max}$) being established (programmed). It was possible to show that the thermomechanical history of a shape memory polymer has no effect on its further programming, i.e. the relationship between programming temperature and switching temperature remains unchanged.

In a further advantageous embodiment of the invention, the programming method according to the invention is carried out for a plurality of shape memory polymers of corresponding composition, in each case different programming temperatures ($T_{prog}$) being used for the individual shape memory polymers and hence different switching temperatures ($T_{switch}$, $T_{\sigma max}$) being programmed. The result of this procedure is a series of programmed polymers (or moldings produced from these polymers) which are present in their temporary shape and, in spite of having the same chemistry, have different switching temperatures.

The invention is not limited to certain shape memory materials or shapes. For example, a non-porous material or a porous, open-pore or closed-pore material can be used as the shape memory polymer.

Further advantageous configurations of the invention form the subject matter of the independent claims. The invention is explained in more detail below in working examples with reference to the associated figures.

FIG. 1 shows stress-strain curves for a PDLCL multiblock copolymer (40% by weight of PPDL) during its programming at $T_{prog}=55°$ C. (FIGS. 1a and 1c) and $T_{prog}=25°$ C. (FIGS. 1b and 1d) and its recovery under load (FIGS. 1a and 1b) and in the absence of a load (FIGS. 1c and 1d);

FIG. 2 shows stress-temperature curves for a PDLCL multiblock copolymer (50% by weight of PPDL) programmed at four different programming temperatures during its recovery under load;

FIG. 3 shows the relationship between the programming temperature $T_{prog}$ and the switching temperature $T_{\sigma,max}$ determined on recovery in the absence of a load (square symbols) and the switching temperature $T_{sw}$ determined on recovery under load (solid circles) for a PDLCL multiblock copolymer (50% by weight of PPDL), which was programmed in four successive programming cycles at increasing $T_{prog}$ (vertically half-filled squares) or decreasing $T_{prog}$ (horizontally half-filled squares) or in each case three successive programming cycles at the same $T_{prog}$ (open squares and solid circles);

FIGS. 4c and 4d: $T_{prog}=55°$ C.; $T_{switch}=56°$ C.);

Figure 7:
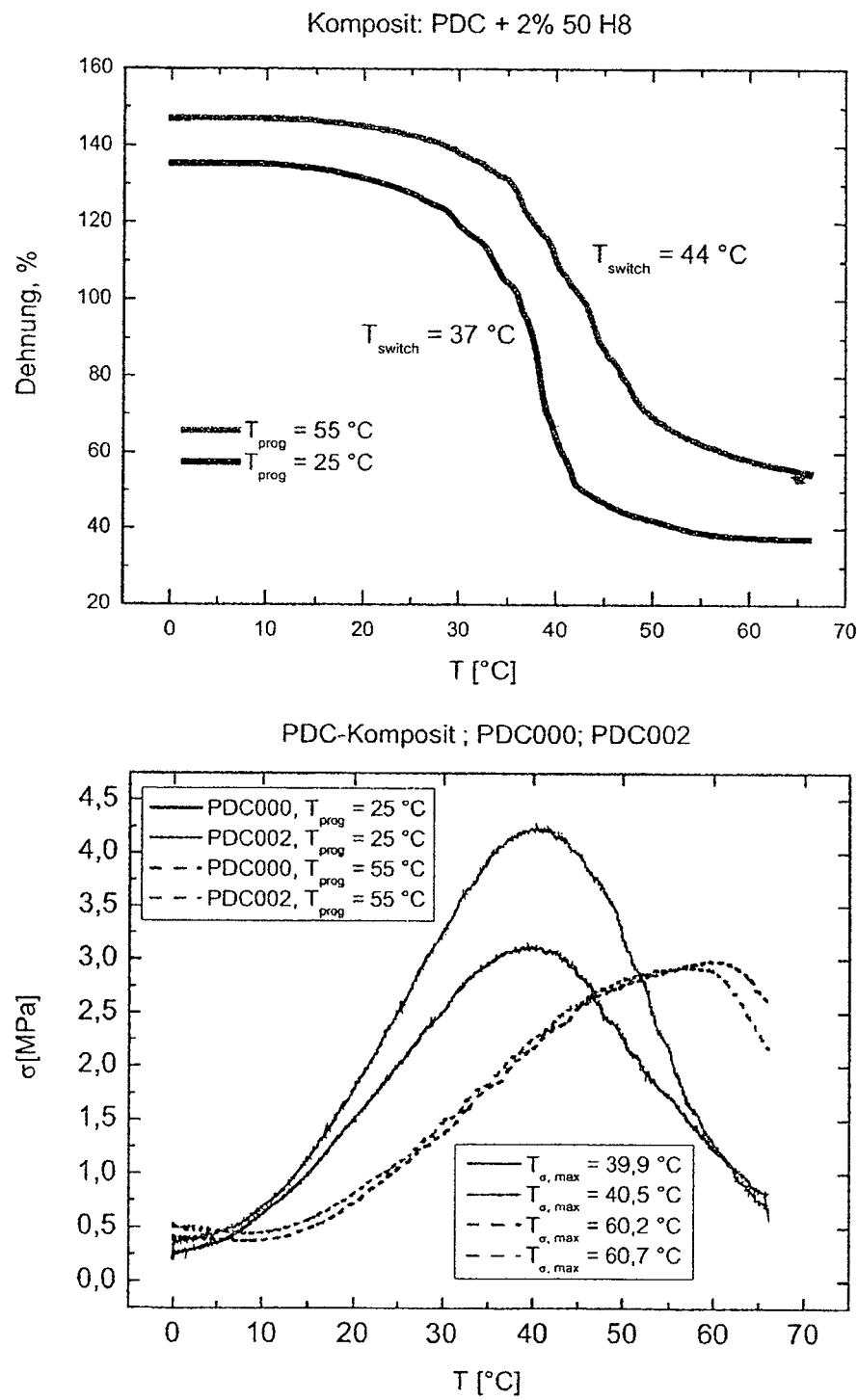
Figure 8:
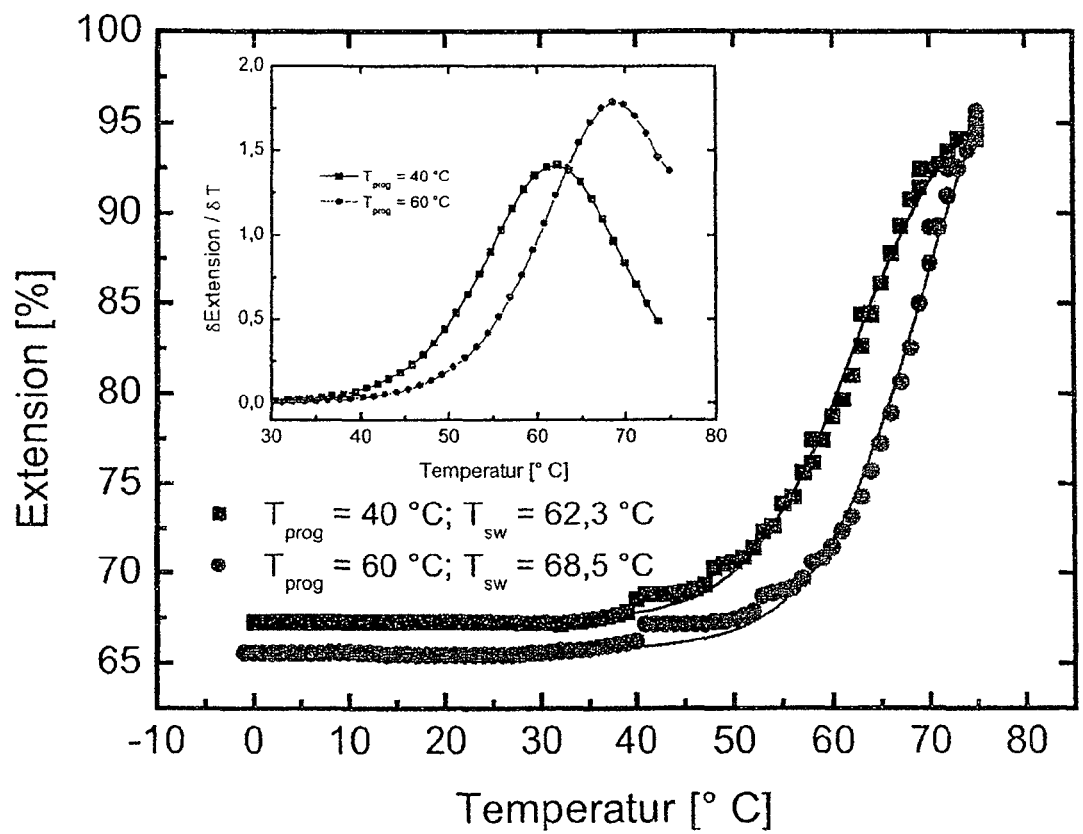

FIG. 7 shows strain-temperature curves (top) and stress-temperature curves (bottom) for a shape memory composite (PDC multiblock copolymer comprising semicrystalline switching segments and Fe nanoparticles) programmed at different programming temperatures, during its recovery in the absence of a load (top) and recovery under load (bottom); and FIG. 8 shows strain-temperature curves during the recovery of a foam programmed at 40° C. and at 60° C. and comprising PDLCL multiblock copolymer (40% by weight of PPDL).

In addition to their current, temporary shape (A), shape memory polymers are capable of storing a further, permanent shape (B) which they assume again after application of an external stimulus, e.g. temperature increase. The present invention relates to polymers (including composites thereof) which show a thermally induced shape memory effect.

Shape memory polymers have the ability to assume a defined, temporarily fixed shape (A) after appropriate thermomechanical treatment and to return to their original form (B) after heating above the switching temperature. The shape memory polymers which show a thermally induced shape memory effect may be either covalent polymer networks (e.g. thermosets, photosets), thermoplastic elastomers (e.g. multiblock copolymers, polyester urethanes) or blends (polymer mixtures) and composites of the abovementioned plastics classes.

Shape memory functionality is obtained by combination of a certain molecular structure of the polymers and a thermomechanical conditioning. In a first classic processing step, the so-called permanent shape of the polymer is first generated. This is followed by the programming, i.e. the generation of the temporary, visible form. In a typical shape memory experiment, the polymer is first heated to a temperature $T_{prog}>T_{trans}$ (transition temperature of the switching segment; $T_{trans}=T_m$ or $T_g$) and converted into the temporary shape at this temperature and cooled to a temperature $T<T_{trans}$ while maintaining the forced shaping. In a further operation, the recovery of the original permanent form is then effected by heating to a temperature ($T_{high}$) above $T_{trans}$. This recovery can take place either in the absence of a load or under a predetermined load. In the case of the stress-free recovery, the characteristic switching temperature $T_{switch}$ is obtained from the point of inflection of the strain-temperature curve (Lendlein & Kelch, Angew. Chem. Int. Ed. Engl. 2002, 41, 2034-2057). In the case of recovery under load, the stress-temperature curve has a characteristic maximum ($T_{\sigma,max}$) (Gal et al., J. Biomed. Mater. Res., Part A 2005, 73, 339-348). $T_{\sigma,max}$ results from two opposite processes on heating, firstly from an increase in the force on temperature increase and secondly from the increasing softening of the plastic with increasing temperature.

In addition to the typical programming above $T_{trans}$, already presented above, the prior art furthermore reports the method of cold drawing below $T_{trans}$ for programming shape memory polymers and the corresponding effects on the shape memory properties (e.g. Ping et al., Biomacromolecules 2005, 6, 587-592, 18-20; Mohr et al., PNAS 2006, 103, 3540-3545).

A method for generating a temperature memory in the case of shape memory polymers has not been described to date. Corresponding "temperature memory" behavior is known in the literature only for metallic shape memory alloys (SMA) and for polymer-CNT composites which owe their shape memory property to the carbon fibers (see above, Zheng et al. or Miaudet et al.).

The substantial innovation of the method described here for generating temperature memory behavior of shape memory polymers lies in the introduction of a novel parameter in the programming, the programming temperature, which was varied systematically in the range of, for example, 50 K. The investigations of temperature memory were carried out on different shape memory polymers comprising semicrystalline or amorphous switching segments. The underlying principle of operation is demonstrated by way of example using the example of linear multiblock copolymers (PDLCL) [example 1] comprising a semicrystalline switching segment based on poly-ε-caprolactone (PCL) and a likewise semicrystalline rigid segment comprising poly-ω-decadolactone (PPDL), on bulk test specimens and on foams [example 5]. In addition, the temperature memory of amorphous shape memory polymers was shown using the example of a commercial polyether urethane Tecoflex® (EG72D) [example 3] and for shape memory polymer composites based on a polyester urethane PDC [example 4] comprising a semicrystalline PCL switching segment and for multiphase polymer networks comprising two crystalline switching segments (PPDLT-co-PCLT) [example 6].

Example 1

PDLCL Multiblock Copolymers Comprising a Semicrystalline Switching Segment

Synthesis:

For the experiments, a series of PDLCL copolymers having different proportions of switching segment was synthesized. The synthesis was effected by reacting the telechelic macrodiols poly-ε-caprolactone ($M_n$=3000 g/mol; $T_m$=42° C.) and poly-ω-decadolactone ($M_n$=5600 g/mol; $T_m$=84° C.) with 2,2(4),4-trimethylhexane diisocyanate (TMDI). The characteristic data for describing the copolymers prepared are listed in table 1. For all multiblock copolymers, two melt transitions and two crystallization transitions were observed in DSC thermograms, which indicates the presence of crystalline PCL and PPDL domains. The peak maximum temperature of the tan δ curve ($T_{\delta,max}$) determined by means of dynamic-mechanical thermal analysis at variable temperatures shows a mixed amorphous phase. The PDLCL multiblock copolymer has the following structure:

stress as well as under a predetermined load. For all experiments, three successive cycles, in each case comprising the programming section and recovery section, were carried out.

In the programming, each test specimen was first heated to the programming temperature ($T_{prog}$, variable) and then extended at this temperature to a predetermined strain ($\epsilon_m$=150%, constant parameter). This was followed by the fixing of the temporary shape by cooling to $T_{low}$=0° C. (constant parameter) while maintaining the forced shaping. The substantial innovation in the programming step is the introduction of a novel, variable parameter, the programming temperature $T_{prog}$, and a systematic variation for achieving a predetermined switching temperature ($T_{switch}$, $T_{\sigma,max}$). For the PDLCL copolymers, the programming temperatures $T_{prog}$=25° C., 35° C., 45° C. and 55° C. were used in each case.

The subsequent recovery process for recovering the original permanent form of the test specimens was effected by heating to the recovery temperature $T_{high}$=70° C. (constant parameter). Measured quantities here were the switching temperature $T_{switch}$ or $T_{\sigma,max}$ resulting from the chosen pro-

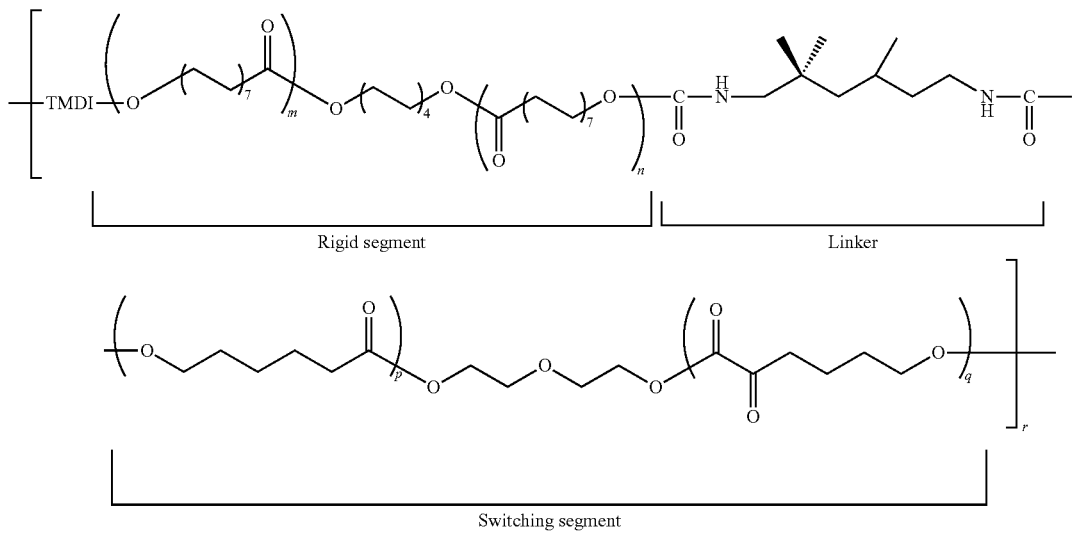

TABLE 1

| Sample ID*) | PPDL (w %) | $M_n$ (g·mol$^{-1}$) | PD | $T_{max,\delta}$ (° C.) | $T_{m,PCL}$ (° C.) | $T_{m,PPDL}$ (° C.) | $\Delta H_m$ (J·g$^{-1}$) | $\Delta H_{m,PPDL}$ (J·g$^{-1}$) |
|---|---|---|---|---|---|---|---|---|
| PDLCL100 | 100 | 55000 | 3.4 | — | — | 86 | 104 | 104 |
| PDLCL060 | 60 | 86000 | 3.3 | −22 | — | 82 | 103 | 92 |
| PDLCL050 | 50 | 59000 | 2.0 | −25 | 44 | 86 | 101 | 70 |
| PDLCL040 | 40 | 58000 | 2.2 | −33 | 43 | 82 | 92 | 53 |
| PDLCL030 | 30 | 116000 | 2.7 | −33 | 43 | 81 | 87 | 42 |

*)The three-digit number indicates the proportion by mass of PPDL in % by weight (w %)

Temperature Memory of PDLCL Multiblock Copolymers:

For detecting the temperature memory effect of PDLCL shape memory polymers, cyclic thermomechanical experiments were carried out on tensile test specimens (according to DIN EN ISO 1BB) of the polymers in a tensile tester equipped with a thermal chamber (Zwick).

The shape memory experiments carried out were divided into a programming method for converting the test specimens into a temporary shape and the triggering of the shape memory effect for recovery of the permanent shape. The investigation of the recovery was effected in the absence of gramming temperature $T_{prog}$. In the case of the stress-free recovery (δ=0 Mpa), the characteristic switching temperature $T_{switch}$ is obtained from the point of inflection of the strain-temperature curve. In the case of the recovery under load, the stress-temperature curve has a characteristic maximum ($T_{\sigma,max}$).

Figure 1:
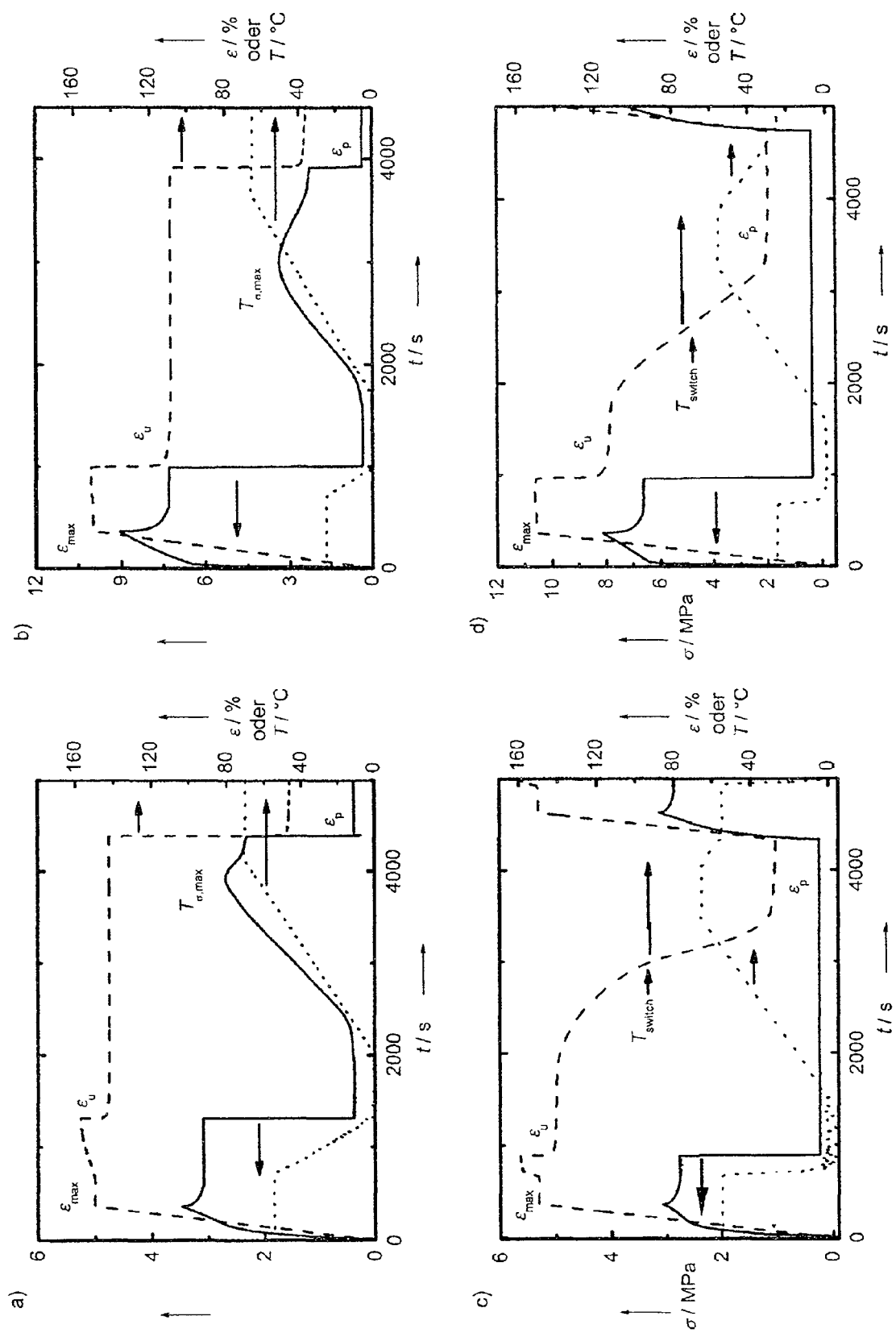

FIG. 1 shows the typical stress-strain-temperature curves for the stress-free recovery (FIGS. 1c and 1d) and the recovery under load (FIGS. 1c and 1d) for the example of the PDLCL copolymer with 40% proportion of PPDL for $T_{prog}$=25° C. (FIGS. 1b and 1d) and 55° C. (FIGS. 1a and 1c).

The dotted lines each show the temperature progression according to a predetermined temperature regime, the dashed lines show the percentage strain ε (either applied as forced shaping or resulting in the absence of a load, as a function of the temperature) and the continuous lines show the measured stress modulus σ. The programming process takes place in the figures in each case between 0 and about 1000 s and the recovery in the subsequent phase takes place by gradual heating to $T_{high}$.

All experiments carried out impressively show that both the switching temperature $T_{switch}$ during the stress-free recovery and the characteristic maximum $T_{\sigma,max}$ in the case of recovery under load can be established independently of the composition of the copolymers by the choice of the programming temperature $T_{prog}$ in the range from 25° C. to 55° C. in the case of PDLCL copolymers. The averaged results are listed in table 2 for all of the PDLCL copolymers prepared, for the two programming temperatures $T_{prog}$=25° C. and 55° C. It is evident that the switching temperature $T_{switch}$ varies in the range from 33° C. to 56° C. and $T_{\sigma,max}$ in the range from 44° C. to 64° C. with increasing programming temperature.

The shape memory polymers investigated showed without exception good shape memory properties with a fixing rate ($R_f$) in the range from 70 to 75% for the lowest programming temperature ($T_{prog}$=25° C.) and from 90 to 100% for $T_{prog}$=55° C., determined in each case by averaging the 2nd and 3rd cycles. The recovery rate ($R_r$) in the 2nd and 3rd cycles ($\overline{R}_r(2-3)$) was in the range from 93 to 98% for all copolymer compositions, independently of the chosen programming temperature.

TABLE 2

| Sample ID[1] | $R_f(1)$ (%) | $\overline{R}_f(2-3)$ (%) | $R_r(1)$ (%) | $\overline{R}_r(2-3)$ (%) | $T_{switch}$ (° C.) | $T_{\sigma, max}$ (° C.) | $\sigma_{max}$ (MPa) |
|---|---|---|---|---|---|---|---|
| PDLCL060[2] | 90 | 89 | 65 | 96 | 55 | 64 | 3.1 |
| PDLCL050[2] | 93 | 93 | 74 | 97 | 56 | 63 | 2.6 |
| PDLCL040[2] | 93 | 93 | 81 | 98 | 54 | 64 | 2.7 |
| PDLCL030[2] | 101 | 101 | 80 | 98 | 54 | 61 | 2.3 |
| PDLCL060[3] | 75 | 70 | 79 | 96 | 33 | 44 | 2.7 |
| PDLCL050[3] | 77 | 70 | 82 | 96 | 36 | 44 | 3.0 |
| PDLCL040[3] | 73 | 71 | 82 | 93 | 34 | 45 | 3.4 |
| PDLCL030[3] | 75 | 75 | 76 | 97 | 39 | 44 | 3.0 |

[1]The three-digit number indicates the proportion by mass of PPDL in % by weight
[2]Programming at $T_{prog}$ = 55° C., recovery at $T_{high}$ = 65° C.
[3]Programming at $T_{prog}$ = 25° C., recovery at $T_{high}$ = 65° C.

Figure 2:
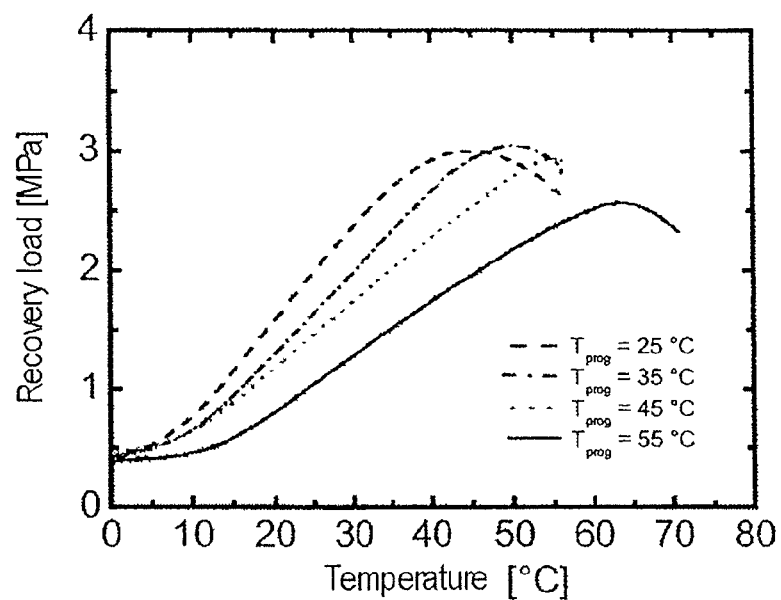

For the example of the PDLCL copolymer with 50% proportion of PPDL, the different stress-temperature curves for the programming temperatures 25° C., 35° C., 45° C. and 55° C. are compared in FIG. 2 (also see table 3).

In supplementary experiments with recovery without load, the influence of the thermomechanical history on the temperature memory ($T_{\sigma,max}$) of the shape memory materials was investigated for the example of PDLCL050. For this purpose, the programming temperature was systematically changed in four successive cycles during an experiment. In a first experiment, the programming temperature $T_{prog}$ was systematically increased with increasing cycle number (cycle 1=25° C., cycle 2=35° C., cycle 3=45° C., cycle 4=55° C.) and in a second experiment the effect of the systematic lowering of the programming temperature during successive cycles was investigated (cycle 1=55° C., cycle 2=45° C., cycle 3=35° C., cycle 4=25° C.).

Figure 3:
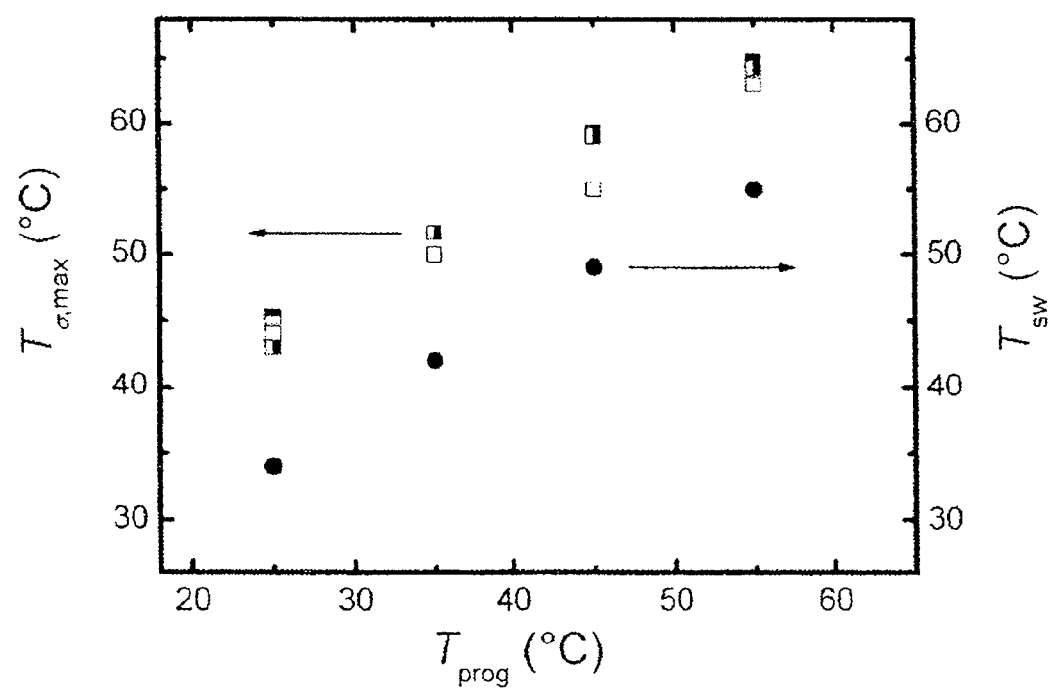

The results are shown in table 3 and FIG. 3. In all experiments, a linear correlation between the programming temperature used and the resulting switching temperature $T_{\sigma,max}$ or $T_{switch}$ ($T_{sw}$ in FIG. 3) could be found, independently of the thermomechanical history. This result confirms a universal applicability of the process described for generating a temperature memory effect in shape memory polymers having semicrystalline switching segments which have a melting point as a transition temperature ($T_{trans}=T_m$).

TABLE 3

| $T_{prog}$/° C. | $T_{\sigma max}$/° C. | $T_{\sigma max}$/° C.* | $T_{\sigma max}$/° C.# | $T_{switch}$/° C. |
|---|---|---|---|---|
| 55 | 63 | 64 | 65 | 55 |
| 45 | 55 | 59 | 59 | 49 |
| 35 | 50 | 52 | 52 | 42 |
| 25 | 44 | 43 | 45 | 34 |

*Systematic increase in the programming temperature $T_{prog}$
Systematic lowering of the programming temperature $T_{prog}$ In addition, the "stability" of the temperature memory was investigated by storing in each case a sample (PDLCL040) programmed at 25° C. and at 55° C. for 7, 14 and 28 days at 10° C. before the recovery was triggered by heating to 70° C. The recovery temperatures were compared with those of samples programmed immediately before the recovery. Neither the samples programmed at 25° C. nor those programmed at 55° C. showed a difference in their recovery behavior.

Figure 4:
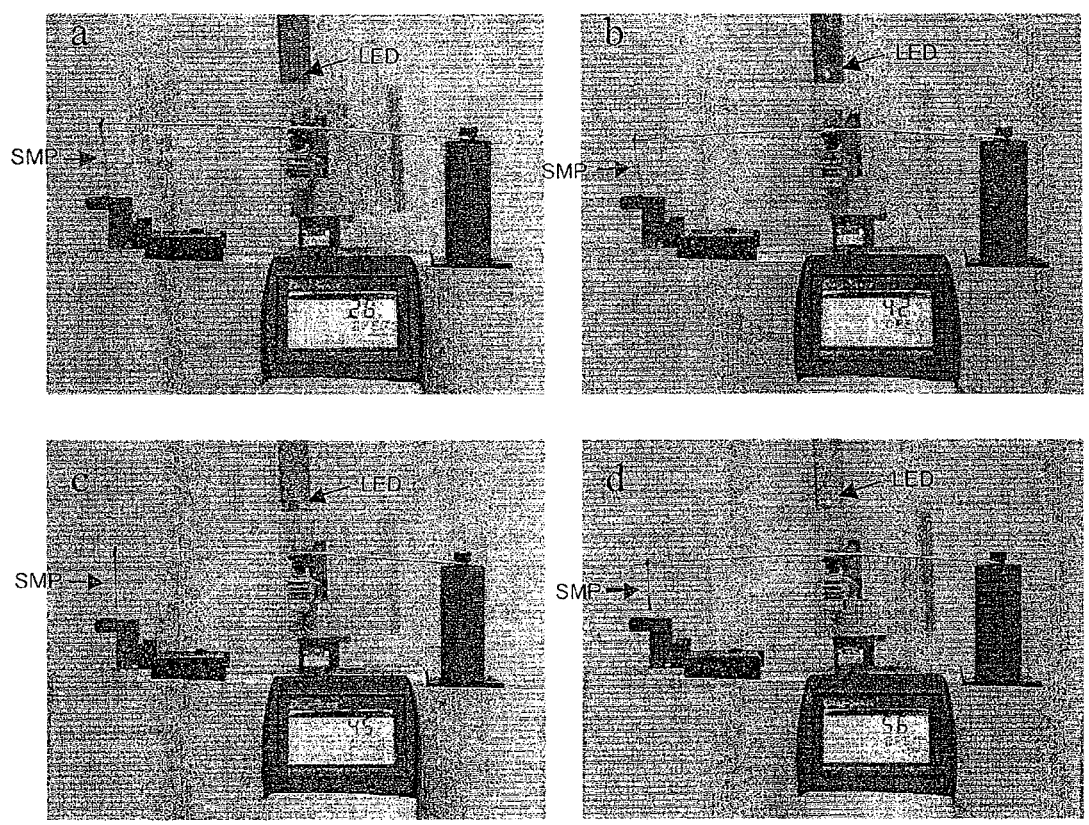
FIG. 4 shows a picture series of a temperature sensor experiment with a shape memory polymer (PDLCL copolymer, 40% by weight of PPDL) as a thermosensitive component which is switchable at different temperatures (FIGS. 4a and 4b: $T_{prog}=35°$ C.; $T_{switch}=42°$ C.

For demonstrating the temperature memory effect of shape memory polymers with regard to possible applications, further experiments were carried out. An experimental setup in which the programmed test specimens (see above description) act as a temperature sensor and trigger, upon their recovery, a switch which is connected to a red LED was developed. This experiment was carried out with two test specimens of the copolymer PDLCL040, which were extended at different programming temperatures ($T_{prog}$=35° C. and $T_{prog}$=55° C.) to $\varepsilon_m$=150% and were cooled while maintaining this forced shaping. In the experimental setup, a thermal couple was additionally integrated for monitoring the temperature on the test specimen (temperature sensor) so that the recovery temperature on transition to the shortened permanent shape could be determined during the subsequent heating. As shown in FIG. 4, the temperature sensor (SMP) switches at different temperatures depending on the previously chosen programming temperature. For $T_{prog}$=35° C., the switching temperature is about 42° C. (FIGS. 4a and 4b) and for $T_{prog}$=55° C. the switching temperature is about 56° C. (FIGS. 4c and 4d). This experiment shows the applicability of the method according to the invention for producing a reprogrammable overheating switch which switches at predetermined variable temperatures without changing the shape memory material.

A further potential application of the programming method according to the invention relates to intelligent medical devices, in particular instruments for minimally invasive surgical procedures. For this purpose, an "intelligent" cable was produced from PDLCL060 in a permanent shape curved by 90° and was then converted into a straight temporary shape at $T_{prog}=37°$ C. and 55° C. While the recovery of the cable programmed at 37° C. to the curved shape took place at as low as body temperature, the recovery of the permanent shape in the case of the cable programmed at 55° C. was observable only above 50° C. (results not shown). In this way, by a targeted choice of the programming temperature, the surgeon can determine whether the programmed article performs the shape transition directly on implantation as a result of the body temperature or only after active heating to slightly above the body temperature.

Example 2

PDC Multiblock Copolymer with a Semicrystalline Switching Segment

Figure 5:
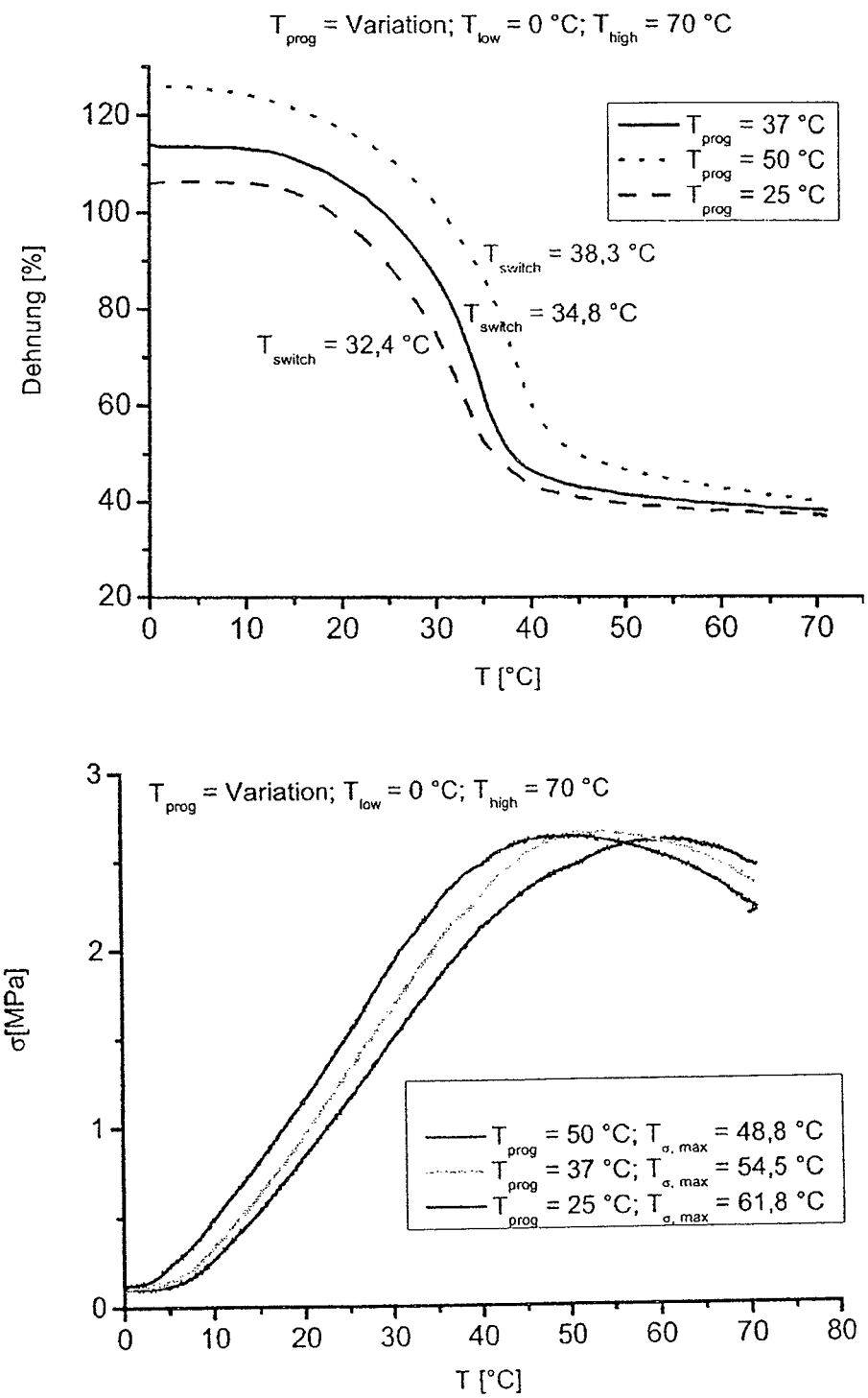
FIG. 5 shows strain-temperature curves (top) and stress-temperature curves (bottom) for a PDC multiblock copolymer programmed at three different programming temperatures and comprising semicrystalline PCL switching segments, during its recovery in the absence of a load (top) and recovery under load (bottom)

The temperature memory effect was furthermore demonstrated for a PDC multiblock copolymer with a poly-ε-caprolactone switching segment ($M_n=2000$ g/mol; $T_m=35°$ C.) and a poly-p-dioxanone rigid segment ($M_n=4500$ g/mol; $T_m=89°$ C.). The shape memory experiments were carried out analogously to the investigations described under example 1 on PDLCL copolymers at the programming temperatures $T_{prog}=25°$ C., $T_{prog}=37°$ C. and $T_{prog}=50°$ C. (table 4). FIG. 5 shows the resulting stress-temperature and strain-temperature curves. These experiments too confirm a linear relationship between programming temperature used and resulting switching temperature, i.e. the temperature memory effect.

TABLE 4

| $T_{prog}/°$ C. | $T_{\sigma max}/°$ C. | $T_{switch}/°$ C. |
|---|---|---|
| 25 | 48.8 | 32.4 |
| 37 | 54.5 | 34.8 |
| 50 | 61.8 | 38.8 |

Example 3

Tecoflex® EG72D, Multiblock Copolymer with an Amorphous Switching Segment

Figure 6:
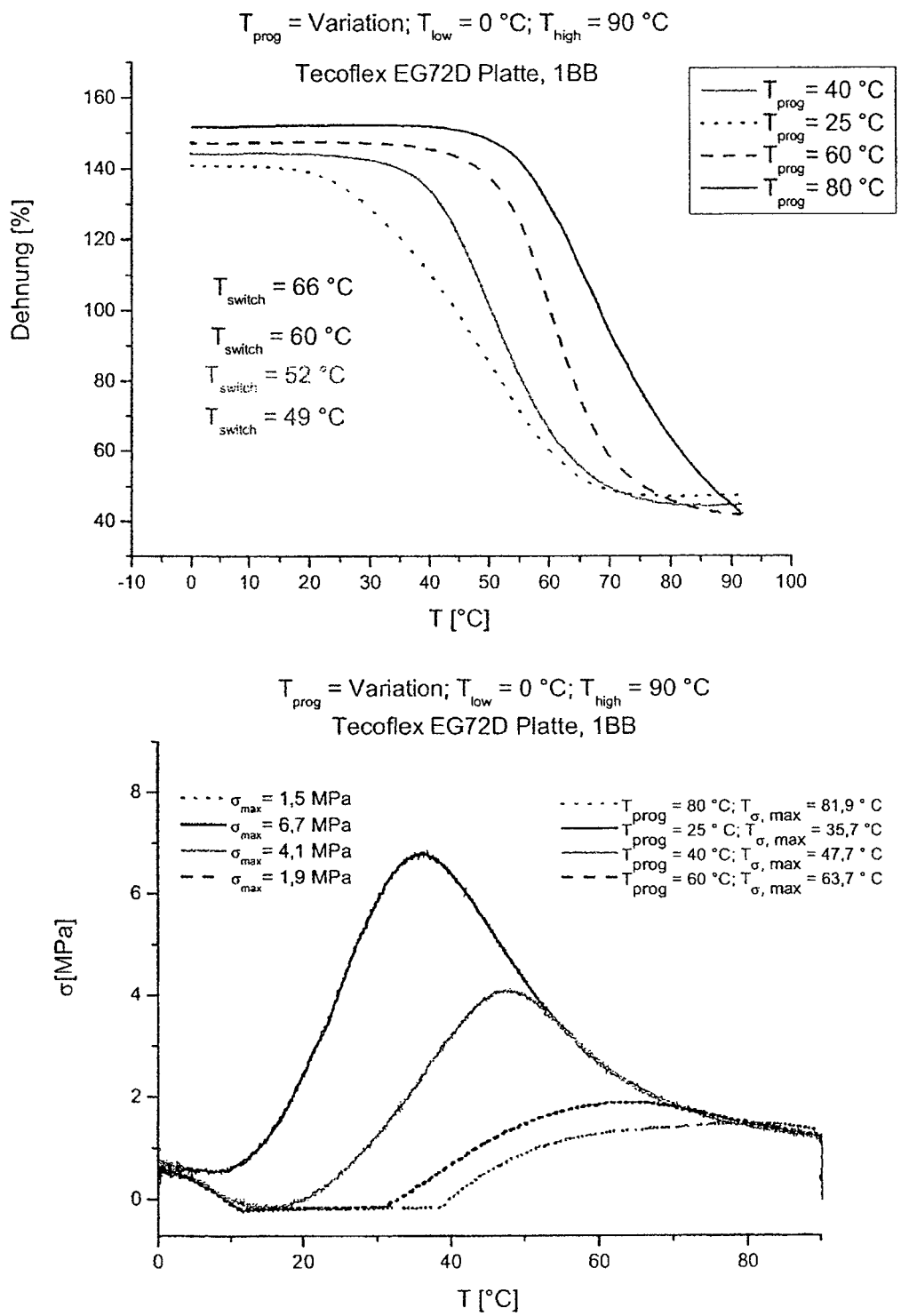
FIG. 6 shows strain-temperature curves (top) and stress-temperature curves (bottom) for a Tecflex® multiblock copolymer programmed at four different programming temperatures and comprising amorphous switching segments, during its recovery in the absence of a load (top) and recovery under load (bottom)

The temperature memory effect for a shape memory polymer with an amorphous switching segment having a glass transition temperature ($T_g=74°$ C.) was demonstrated for the example of the polyether urethane Tecoflex® [described in: Mohr et al., PNAS 2006, 103, 3540-3545]. In the corresponding shape memory experiment, the programming temperature was lowered in four successive cycles from 80° C. to 60° C., 40° C. and 25° C. The parameters $\epsilon_m=150\%$, $T_{low}=0°$ C. and $T_{high}=90°$ C. were not varied. Analogously to examples 1 and 2, both recovery moduli (in the absence of stress and under load) were also used for Tecoflex® for the recovery of the original shape. In these experiments, too, the temperature memory could be shown by a linear relationship between programming temperature $T_{prog}$ used and resulting switching temperature $T_{switch}$ or $T_{\sigma,max}$ (cf. FIG. 6). A significant increase in the resulting force from 1.5 MPa (for $T_{prog}=80°$ C.) to 6.7 MPa (for $T_{prog}=25°$ C.) during the switching process was also found with decreasing programming temperature (table 5).

TABLE 5

| $T_{prog}$ [° C.] | $R_f(1)$ [%] | $R_r(1)$ [%] | $T_{switch}$ [° C.] | $T_{\sigma,max}$ [° C.] |
|---|---|---|---|---|
| 80 | 100 | 75 | 66 | 81.9 |
| 60 | 97 | 97 | 60 | 63.7 |
| 40 | 96 | 97 | 52 | 47.7 |
| 25 | 94 | 97 | 49 | 35.7 |

Recovery at $T_{high}=90°$ C.

Example 4

Composites Comprising PDC Multiblock Copolymer with Semicrystalline PCL Switching Segment and Magnetic Iron Nanoparticles The temperature memory effect was also demonstrated for composites of different compositions (2% by weight, 5% by weight, 10% by weight) consisting of PDC with a poly-ε-caprolactone switching segment ($M_n=2000$ g/mol; $T_m=35°$ C.) and magnetic iron nanoparticles [described in: Yakacki et al., Biomaterials 2007, 28, 2255-2263]. The shape memory experiments were carried out analogously to the investigations described under example 1 on PDLCL copolymers, at the programming temperatures $T_{prog}=25°$ C., and $T_{prog}=55°$ C. ($\epsilon_m=150\%$, $T_{low}=0°$ C., $T_{high}=65°$ C. constant for all experiments).

In all experiments, the observed switching temperatures were independent of the composition of the composites. For $T_{prog}=25°$ C., the resulting switching temperature $T_{switch}$ was about 37° C. and $T_{\sigma,max}$ was from 38° C. to 40° C. At $T_{prog}=55°$ C., a correspondingly higher switching temperature $T_{switch}$ of about 42° C. and $T_{\sigma,max}$ of from 57° C. to 60° C. were, as expected, observable (cf. FIG. 7 and table 6).

These experiments clearly showed that the method described for generating the temperature memory is also effective in the case of shape memory polymer composites. The decisive advantage of such composites is once again the fact that they can be converted without contact from the temporary shape (A) to the original shape (B).

TABLE 6

| Sample ID[a] | Nanoparticle Content [wt %]* | $T_{switch}$ [° C.] | $T_{\sigma,max}$ [° C.] | $\sigma_{max}$ [MPa] | Sample ID[a] | $T_{switch}$ [° C.] | $T_{\sigma,max}$ [° C.] | $\sigma_{max}$ [MPa] |
|---|---|---|---|---|---|---|---|---|
| PDC000[b] | 0 | 37.6 | 39.9 | 3.1 | PDC000[c] | 42.5 | 60.2 | 3.0 |
| PDC002[b] | 1.7 | 37.0 | 40.5 | 4.2 | PDC002[c] | 43.1 | 60.7 | 2.6 |
| PDC005[b] | 4.2 | 33.2 | 38.6 | 3.7 | PDC005[c] | 42.1 | 57.7 | 2.4 |
| PDC010[b] | 9.3 | 37.8 | 38.3 | 3.8 | PDC010[c] | 41.6 | 57.2 | 2.9 |

[a]The three-digit number gives the proportion by MASS of nanoparticles in percentage by weight in the composite.
[b]Programming at $T_{prog}=55°$ C., recovery at $T_{high}=65°$ C.
[c]Programming at $T_{prog}=25°$ C., recovery at $T_{high}=65°$ C.
*Determined by TGA measurements.

Example 5

Foams Comprising PDLCL Multiblock Copolymers

Synthesis:

The preparation of PDLCL foams was effected by the pressure quench process with the use of supercritical $CO_2$ (cf. Singh et al., Biomaterials 2004. 25, 2611-2617 or Weigel et al., Expert Rev. Med. Devices 2006, 3 (6), 835-851). A multiblock copolymer having a proportion of 40% of PPDL according to example 1 was used ($M_n$=100 000 g/mol). The synthesis was effected by reacting the telechelic macrodiols poly-ε-caprolactone ($M_n$=3000 g/mol; $T_m$=48° C.) and poly-ω-decadolactone ($M_n$=4300 g/mol; $T_m$=89° C.) with 1,6-hexamethylene diisocyanate (HDI) in dimethyl carbonate at 85° C. for 72 h.

The characterization of the scaffold by means of scanning electron microscopy (SEM) shows both closed-pore and open-pore structures of the PDLCL foam. The proportion of closed-pore structures was about 50%. The porosity of the foam was about 90% (density=0.1 g/mol).

Temperature Memory of PDLCL Foams:

The shape memory experiments carried out once again divided into a programming method and the recovery or the triggering of the temperature and shape memory effect. The investigation of the recovery was effected virtually in the absence of stress. During the programming, the test specimen was first heated to the programming temperature $T_{prog}$ and then compressed to a predetermined extension ($\varepsilon_m$=50%, constant parameter) at this temperature. An extension of 100% corresponded to the starting length of the cube-shaped scaffold. This was followed by the fixing of the temporary shape by cooling to $T_{low}$=0° C. (constant parameter). The subsequent recovery process for recovering the original permanent form of the test specimen was effected by heating to $T_{high}$=75° C. (constant parameter). Measured quantities were the switching temperature $T_{switch}$ and the temperature range $\Delta T_{rec}$, in which the recovery took place. In contrast to the TME experiments on bulk materials (examples 1-4), a lower heating rate of 1 K/min was used in the case of the foams, owing to their lower thermal conductivity.

In the TME experiment carried out, $T_{prog}$ was varied in three successive cycles (cycle 1: $T_{prog}$=60° C.; cycle 2: $T_{prog}$=40° C.; cycle 3: $T_{prog}$=60° C.). The extension-temperature curves of the stress-free recovery for cycles 1 and 2 are shown in FIG. 8 and the first derivative of the fitted curves for determining $T_{switch}$ is superimposed.

This experiment impressively demonstrates for the example of PDLCL scaffolds that the method for generating a temperature memory effect also functions for foam-like moldings. For $T_{prog}$=40° C., the resulting switching temperature was $T_{switch}$=62.3° C. and at $T_{prog}$=60° C. a correspondingly higher switching temperature $T_{switch}$=68.5° C. was observable in cycle 1 and cycle 3. As in example 1 (PDLCL), a virtually linear correlation between the $T_{prog}$ used and the resulting $T_{switch}$, which is independent of the thermal mechanical history, could also be shown for the PDLCL foams. In comparison with the results of bulk materials (example 1), the observed switching temperatures are about 10 K higher, which is due to the lower thermal conductivity of the porous foams.

Example 6

PPDLT-co-PCLT Multiphase Polymer Networks with Two Crystalline Switching Segments The switching range obtainable with the use of the method according to the invention is limited by the range of the switching temperature $T_m$ of the PCL crystallites in the PDLCL multiblock copolymers according to example 1. In order to extend this temperature memory range, covalent network points which are intended to fix the permanent shape instead of the PPDL crystallites were introduced into the polymers. In this way, the PPDL crystallites in turn should be available as additional switching segments in the PDLCL thermoplastics.

Synthesis:

For this purpose, a series of multiphase polymer networks (PPDLT-co-PCLT) was prepared by co-condensation of star-like hydroxy-telechelic oligo($\bar{\omega}$-pentadecalactone)triol (OPDLT, $M_n$=4000 g·mol$^{-1}$) and oligo(ε-caprolactone)tetraol (OCLT(4), $M_n$=4000 g·mol$^{-1}$ or OCLT(8), $M_n$=8000 g·mol$^{-1}$) with 2,2(4),4-trimethylhexane diisocyanate (TMDI).

In the ring-opening polymerization, OCL-triol ($M_n$=300 g·mol$^{-1}$) was used as a three-armed initiator for the PPDLT synthesis and pentaerythritol was used as a four-armed initiator for the PCLT synthesis. For the preparation of the star-like precursor, the stoichiometric monomer/initiator ratio was adjusted so that a PPDLT and a PCLT precursor with $M_n$ of about 4000 g·mol$^{-1}$ were obtained. The synthesis of the precursors was carried out in a bulk batch under a nitrogen atmosphere at 130° C. (details in: Alteheld et al., Angew. Chem. Int. Ed. 2005 (44), 1188 et seq.). PCLT(8) with $M_n$=8000 g·mol$^{-1}$ was acquired commercially (Solvay Caprolactones). The synthesis of the polymer networks was carried out in solution. For this purpose, the hydroxy-telechelic precursors were dissolved in dichloroethane and mixed under a nitrogen atmosphere. A defined amount of TMDI was added under room temperature with stirring. After further stirring for 5 minutes, the mixture was poured into Teflon dishes and kept at 60° C. under nitrogen stream for 24 h in order to thoroughly evaporate the solvent with formation of the polymer. For the crosslinking, the films were kept at 80° C. under reduced pressure for 4 days. After the polymerization, the samples were extracted with chloroform in order to remove unconverted substances.

All multiphase polymer networks thus produced had high proportions of gel of from 92 to 94%, which indicates virtually complete incorporation of the precursors into the polymer network. Two separate melt transitions which could be assigned to the crystalline PCL and PPDL domains were observed in the DSC thermograms.

Temperature Memory of the PPDLT-co-PCL Multiphase Polymer Networks:

The temperature memory properties of the multiphase polymer networks were once again investigated in cyclic thermomechanical experiments comprising a thermomechanical programming ($\varepsilon_m$=150%, $T_{low}$=0° C. and $T_{high}$=115° C.) and a subsequent recovery of the permanent shape under load-free conditions ($\sigma$=0 MPa), $T_{prog}$ being varied in successive cycles from 30° C. to 60° C. to 90° C. All polymer network systems showed values for $R_f$ in the range from 97 to 100%, while the $R_r$ values increased with increasing programming temperature $T_{prog}$ from 81% ($T_{prog}$=30° C.) to 99% ($T_{prog}$=90° C.).

$T_{switch}$ could be controlled by varying $T_{prog}$ precisely within the temperature ranges of the two melt transitions, independently of the network composition, with switching temperatures of $T_{switch}$=29° C. ($T_{prog}$=30° C.), $T_{switch}$=59° C. ($T_{prog}$=60° C.) and $T_{switch}$=75-81° C. ($T_{prog}$=90° C.). In contrast to the thermoplastic multiblock copolymers from example 1, a decrease in the recovery temperature range $\Delta T_{rec}$ from 40 to 15 K with increasing $T_{prog}$ was observed for the multiphase polymer networks, which might be explainable by the contributions of the two isomorphic crystalline PPDL and PCL domains during the thermomechanical programming.

The invention claimed is:

1. A method for programming a shape memory polymer or a composite material of such a polymer and magnetic particles dispersed therein, which has at least one switching segment with at least one thermal phase transition and covalent and/or non-covalent crosslinking points, so that, after its programming, the shape memory polymer is capable of undergoing a transition from a programmed temporary shape (A) to its permanent shape (B) after a temperature increase to a temperature ($T_{high}$) which corresponds at least to a switching temperature ($T_{switch}$, $T_{\sigma max}$) of the polymer, the programming having the following steps:

(a) predetermination of a programming temperature ($T_{prog}$) as a function of a desired switching temperature ($T_{switch}$, $T_{\sigma max}$), wherein the predetermination is effected computationally with the use of an empirically determined mathematical relationship between the programming temperature ($T_{prog}$) and the switching temperature ($T_{switch}$, $T_{\sigma max}$) or with the use of an empirically determined characteristic diagram containing parameter pairs comprising programming temperature ($T_{prog}$) and switching temperature ($T_{switch}$, $T_{\sigma max}$), (b) heating of the shape memory polymer to the predetermined programming temperature ($T_{prog}$) being higher than the switching temperature ($T_{switch}$, $T_{\sigma max}$), and transformation of the polymer into a shape corresponding to the temporary shape by use of forced shaping and (c) cooling the polymer to a temperature below the desired switching temperature ($T_{switch}$, $T_{\sigma max}$) while maintaining the forced shaping.

2. The method as claimed in claim 1, wherein the method for programming is carried out several times in succession for a given shape memory polymer, different programming temperatures ($T_{prog}$) being used for the respective programming cycles and hence different switching temperatures ($T_{switch}$, $T_{\sigma max}$) being programmed.

3. The method as claimed in claim 1, wherein in that the method for programming is carried out for a plurality of shape memory polymers of identical composition, in each case different programming temperatures ($T_{prog}$) being used for the individual shape memory polymers and hence different switching temperatures ($T_{switch}$, $T_{\sigma max}$) being programmed.

4. The method as claimed claim 1, wherein the switching segment of the shape memory polymer is a semicrystalline segment having a melt transition ($T_m$) or an amorphous segment with a glass transition ($T_g$).

5. The method as claimed in claim 1, wherein the programming temperature $T_{prog}$ is selected from a range of at least ±20 K around the thermodynamic phase transition temperature $T_{trans}$ of the at least one switching segment.

6. The method as claimed in claim 1, wherein, in the case of a shape memory polymer which has two switching segments and two thermodynamic phase transition temperatures $T_{trans,A}$ and $T_{trans,B}$, the programming temperature $T_{prog}$ is selected from a range from at least $T_{trans,A}$±20 K to $T_{trans,B}$±20 K.

7. The method as claimed in claim 1, wherein a non-porous material or a porous, open-pore or closed-pore material is used as a shape memory polymer.

8. The method as claimed in claim 1, wherein the method for programming is carried out several times in succession for a given shape memory polymer, different programming temperatures ($T_{prog}$) being used for the respective programming cycles and hence different switching temperatures ($T_{switch}$, $T_{\delta.max}$) being programmed; and the predetermination is effected computationally with the use of an empirically determined mathematical relationship between the programming temperature ($T_{prog}$) and the switching temperature ($T_{switch}$, $T_{\sigma max}$).

9. The method as claimed in claim 1, wherein the method for programming is carried out several times in succession for a given shape memory polymer, different programming temperatures ($T_{prog}$) being used for the respective programming cycles and hence different switching temperatures ($T_{switch}$, $T_{\delta.max}$) being programmed; and the predetermination of the programming temperature ($T_{prog}$) is effected with the use of an empirically determined characteristic diagram containing parameter pairs comprising programming temperature ($T_{prog}$) and switching temperature $T_{switch}$, $T_{\sigma max}$).

10. The method as claimed in claim 1, wherein the method for programming is carried out for a plurality of shape memory polymers of identical composition, in each case different programming temperatures ($T_{prog}$) being used for the individual shape memory polymers and hence different switching temperatures ($T_{switch}$, $T_{\delta.max}$) being programmed; and the predetermination is effected computationally with the use of an empirically determined mathematical relationship between the programming temperature ($T_{prog}$) and the switching temperature ($T_{switch}$, $T_{\sigma max}$).

11. The method as claimed in claim 1, wherein the method for programming is carried out for a plurality of shape memory polymers of identical composition, in each case different programming temperatures ($T_{prog}$) being used for the individual shape memory polymers and hence different switching temperatures ($T_{switch}$, $T_{\delta.max}$) being programmed; and the predetermination of the programming temperature ($T_{prog}$) is effected with the use of an empirically determined characteristic diagram containing parameter pairs comprising programming temperature ($T_{prog}$) and switching temperature ($T_{switch}$, $T_{\sigma max}$).

12. The method as claimed in claim 2, wherein the method for programming is carried out for a plurality of shape memory polymers of identical composition, in each case different programming temperatures ($T_{prog}$) being used for the individual shape memory polymers and hence different switching temperatures ($T_{switch}$, $T_{\delta.max}$) being programmed.

13. The method as claimed in claim 1, wherein the switching segment of the shape memory polymer is a semicrystalline segment having a melt transition ($T_m$) or an amorphous segment with a glass transition ($T_g$); and the predetermination is effected computationally with the use of an empirically determined mathematical relationship between the programming temperature ($T_{prog}$) and the switching temperature ($T_{switch}$, $T_{\sigma max}$).

14. The method as claimed in claim 1, wherein the switching segment of the shape memory polymer is a semicrystalline segment having a melt transition ($T_m$) or an amorphous segment with a glass transition ($T_g$); and the predetermination of the programming temperature ($T_{prog}$) is effected with the use of an empirically determined characteristic diagram containing parameter pairs comprising programming temperature ($T_{prog}$) and switching temperature ($T_{switch}$, $T_{\sigma max}$).

15. The method as claimed in claim 2, wherein the switching segment of the shape memory polymer is a semicrystalline segment having a melt transition ($T_m$) or an amorphous segment with a glass transition ($T_g$).

16. The method as claimed in claim 3, wherein the switching segment of the shape memory polymer is a semicrystalline segment having a melt transition ($T_m$) or an amorphous segment with a glass transition ($T_g$).

17. The method as claimed in claim 1, wherein the programming temperature $T_{prog}$ is selected from a range of at least .+−0.20 K around the thermodynamic phase transition temperature $T_{trans}$ of the at least one switching segment; and
   the predetermination is effected computationally with the use of an empirically determined mathematical relationship between the programming temperature ($T_{prog}$) and the switching temperature ($T_{switch}$, $T_{\sigma max}$).

18. The method as claimed in claim 1, wherein the programming temperature $T_{prog}$ is selected from a range of at least .+−0.20 K around the thermodynamic phase transition temperature $T_{trans}$ of the at least one switching segment; and
   the predetermination of the programming temperature ($T_{prog}$) is effected with the use of an empirically determined characteristic diagram containing parameter pairs comprising programming temperature ($T_{prog}$) and switching temperature ($T_{switch}$, $T_{\sigma max}$).

* * * * *